(12) United States Patent
Lubberger et al.

(10) Patent No.: US 10,443,761 B2
(45) Date of Patent: Oct. 15, 2019

(54) METHOD AND DEVICE FOR TRENCHLESS PIPE LAYING

(71) Applicant: HERRENKNECHT AG, Schwanau (DE)

(72) Inventors: Michael Lubberger, Schwanau (DE); Diana Rennkamp, Lahr (DE)

(73) Assignee: Herrenknecht AG, Schwannau (DE)

( * ) Notice: Subject to any disclaimer, the term of this patent is extended or adjusted under 35 U.S.C. 154(b) by 0 days.

(21) Appl. No.: 15/104,209

(22) PCT Filed: Dec. 18, 2014

(86) PCT No.: PCT/EP2014/003425
§ 371 (c)(1),
(2) Date: Jun. 13, 2016

(87) PCT Pub. No.: WO2015/096894
PCT Pub. Date: Jul. 2, 2015

(65) Prior Publication Data
US 2017/0045156 A1    Feb. 16, 2017

(30) Foreign Application Priority Data
Dec. 23, 2013   (DE) ........................ 10 2013 021 889

(51) Int. Cl.
*F16L 1/028*    (2006.01)
*E21B 7/04*     (2006.01)
(Continued)

(52) U.S. Cl.
CPC .............. *F16L 1/036* (2013.01); *E21B 7/046* (2013.01); *E21B 7/20* (2013.01); *E21B 7/28* (2013.01);
(Continued)

(58) Field of Classification Search
CPC .......... E21C 27/24; E21C 25/58; E21C 41/16; E21C 25/00; E21D 9/1093; E21D 11/00; E21D 13/00
(Continued)

(56) References Cited

U.S. PATENT DOCUMENTS 1,006,799 A * 10/1911 Scholz .................. E21D 11/102
                                                    405/150.1
1,140,673 A *  5/1915 Giggey .................. E21D 9/106
                                                    175/319
(Continued)

FOREIGN PATENT DOCUMENTS

CN    102587833 A   7/2012
DE    19646341 C1   7/1998
(Continued)

*Primary Examiner* — Benjamin F Fiorello
*Assistant Examiner* — Edwin J Toledo-Duran
(74) *Attorney, Agent, or Firm* — Mark Rodgers

(57) ABSTRACT

Methods and devices for a boring and laying device for the trenchless laying of a pipeline, including a boring head, wherein the boring head includes a connection for a pilot bore linkage, wherein a pilot bore is produced from a starting point to a destination point along a predetermined boring line, a pump for suctioning and conveying away the drillings, a conveying portion behind the boring head in which at least one suction element for receiving and conveying away drillings, and a connecting portion including a connection for the pipeline. The pilot borehole is expanded, and simultaneously the pipeline is laid by pulling the pilot bore linkage out of the borehole on one side and/or by pushing the pipeline into the borehole, wherein drillings are hydraulically received behind the boring head of the boring and laying device and conveyed away out of the borehole with a pump.

17 Claims, 2 Drawing Sheets

Figure 1:
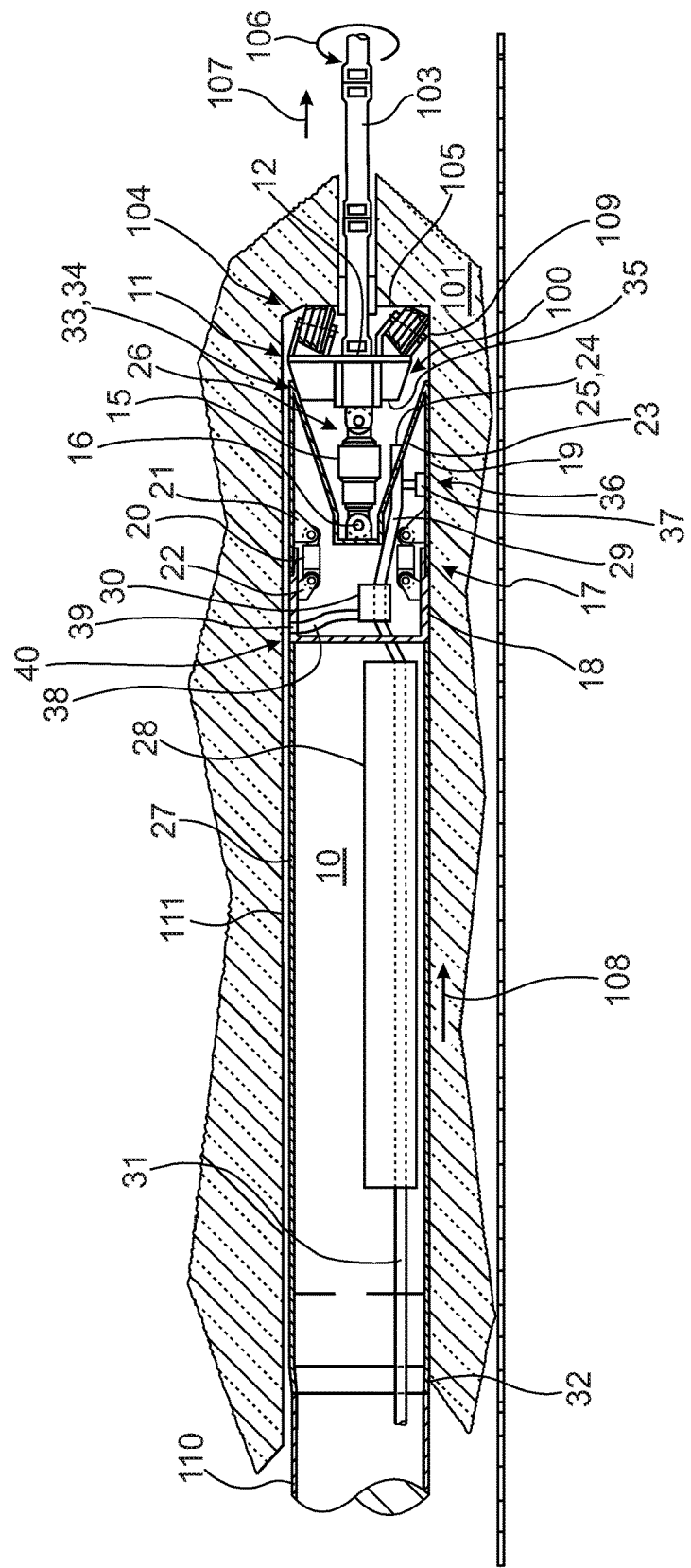

(51) Int. Cl.
    *E21B 7/06*         (2006.01)
    *F16L 1/036*      (2006.01)
    *E21B 7/20*         (2006.01)
    *E21B 7/28*         (2006.01)
    *F16L 1/032*      (2006.01)
    *E21B 10/28*      (2006.01)
    *E21B 4/02*         (2006.01)
    *E21B 21/00*      (2006.01)

(52) U.S. Cl.
    CPC .............. *E21B 10/28* (2013.01); *F16L 1/032* (2013.01); *E21B 4/02* (2013.01); *E21B 21/002* (2013.01)

(58) Field of Classification Search
    USPC ...... 166/312, 372, 370, 68, 105; 175/53, 62, 175/324, 323, 100, 102, 316, 19–23, 61, 175/84; 299/30, 33, 64, 67, 68, 77, 78; 405/146, 150.1, 151
    See application file for complete search history.

(56) References Cited

U.S. PATENT DOCUMENTS

| | | | | |
|---|---|---|---|---|
| 1,276,706 A * | 8/1918 | Aydelotte | ............... | F42B 12/08 102/362 |
| 1,292,159 A * | 1/1919 | Trumpour | ............... | E21D 9/08 299/57 |
| 1,361,996 A * | 12/1920 | Hirst | ............... | E21D 9/10 299/33 |
| 1,751,147 A * | 3/1930 | Hackley | ............... | E21D 11/102 249/1 |
| 1,880,091 A * | 9/1932 | Hughes | ............... | E21C 27/30 299/67 |
| 1,903,866 A * | 4/1933 | Lacaprara | ............... | E21D 9/0692 405/150.1 |
| 1,960,394 A * | 5/1934 | Parker | ............... | E21D 9/08 299/33 |
| 2,067,493 A * | 1/1937 | Kinzie | ............... | E02B 9/06 405/146 |
| 2,067,711 A * | 1/1937 | Killmer | ............... | E21D 11/40 405/151 |
| 2,077,137 A * | 4/1937 | Wilkoff | ............... | E21D 11/15 405/151 |
| 2,148,783 A * | 2/1939 | Spaulding | ............... | E21D 11/10 405/147 |
| 2,385,251 A * | 9/1945 | Ayers | ............... | E21D 11/06 299/11 |
| 2,798,714 A * | 7/1957 | Russell | ............... | E21C 27/26 198/312 |
| 2,995,901 A * | 8/1961 | Kemper | ............... | E21D 11/105 405/146 |
| 3,108,788 A * | 10/1963 | Allimann | ............... | E21D 9/11 175/91 |
| 3,301,600 A * | 1/1967 | Bland | ............... | E21D 9/11 299/33 |
| 3,325,217 A * | 6/1967 | Enz | ............... | E21D 9/1053 175/62 |
| 3,350,889 A * | 11/1967 | Sturm | ............... | E21D 9/13 299/33 |
| 3,355,215 A * | 11/1967 | Wallers | ............... | E21D 9/104 299/108 |
| 3,378,305 A * | 4/1968 | Geldmacher | ............... | E21D 9/065 299/33 |
| 3,413,033 A * | 11/1968 | Clark | ............... | E21D 9/112 299/33 |
| 3,459,452 A * | 8/1969 | Schnabel, Jr. | ............... | E21D 9/0879 175/91 |
| 3,480,327 A * | 11/1969 | Matsushita | ............... | E21D 9/10 299/33 |
| 3,508,317 A * | 4/1970 | Hill | ............... | E21D 11/40 228/145 |
| 3,510,170 A * | 5/1970 | Wilms | ............... | E21D 9/1086 299/33 |
| 3,523,426 A * | 8/1970 | Lauber | ............... | E21D 9/04 299/11 |
| 3,556,599 A * | 1/1971 | Fikse | ............... | E21D 9/124 299/11 |
| 3,603,100 A * | 9/1971 | Cowley | ............... | E21D 9/106 299/11 |
| 3,767,263 A * | 10/1973 | Gootee | ............... | E21B 4/18 175/78 |
| 3,861,750 A * | 1/1975 | Follert | ............... | E21C 35/06 175/73 |
| 3,885,832 A * | 5/1975 | Altseimer | ............... | E21D 9/1073 175/11 |
| 3,966,256 A * | 6/1976 | Fikse | ............... | E21D 9/1093 299/33 |
| 3,967,463 A * | 7/1976 | Grandori | ............... | E21D 9/093 405/141 |
| 3,982,340 A * | 9/1976 | Satterwhite | ............... | E02F 3/20 37/190 |
| 4,099,785 A * | 7/1978 | Groetschel | ............... | E21C 35/00 299/11 |
| 4,122,682 A * | 10/1978 | Groetschel | ............... | E21C 35/00 299/11 |
| 4,226,476 A * | 10/1980 | Fairchild | ............... | E21C 27/20 299/31 |
| 4,379,660 A * | 4/1983 | Groetschel | ............... | E21C 35/00 156/577 |
| 4,420,188 A * | 12/1983 | Robbins | ............... | E21D 9/11 299/31 |
| 4,486,050 A * | 12/1984 | Snyder | ............... | E21D 9/11 175/91 |
| 4,494,799 A * | 1/1985 | Snyder | ............... | E21D 9/1086 175/61 |
| 4,637,657 A * | 1/1987 | Snyder | ............... | E21D 9/112 299/31 |
| 4,668,016 A * | 5/1987 | Hart | ............... | E21C 35/20 299/29 |
| 4,753,484 A * | 6/1988 | Stolarczyk | ............... | E21C 35/24 299/1.1 |
| 4,769,192 A * | 9/1988 | Cerutti | ............... | E21D 11/102 264/33 |
| 4,790,395 A * | 12/1988 | Gack | ............... | E21B 7/203 175/102 |
| 4,834,580 A * | 5/1989 | Barendsen | ............... | E21B 4/16 405/138 |
| 4,892,441 A * | 1/1990 | Riker | ............... | E21D 11/105 249/11 |
| 4,915,453 A * | 4/1990 | Fikse | ............... | E21D 9/1093 299/31 |
| 4,960,306 A * | 10/1990 | Kipp | ............... | E21C 27/00 299/41.1 |
| 5,072,994 A * | 12/1991 | Brandl | ............... | E21D 9/102 299/67 |
| 5,096,002 A * | 3/1992 | Cherrington | ............... | E21B 7/20 175/53 |
| 5,169,264 A * | 12/1992 | Kimura | ............... | E21B 7/201 175/62 |
| 5,269,384 A | 12/1993 | Cherrington | | |
| 5,340,199 A * | 8/1994 | Piefenbrink | ............... | E21D 9/115 299/10 |
| 5,803,666 A * | 9/1998 | Keller | ............... | E21B 7/30 405/146 |
| 5,816,750 A * | 10/1998 | Steffenino | ............... | E21C 27/24 405/302.3 |
| 6,109,828 A * | 8/2000 | Keller | ............... | B29C 63/36 175/53 |
| 6,199,591 B1 * | 3/2001 | Kiest, Jr. | ............... | B29C 63/36 138/97 |
| 6,220,670 B1 * | 4/2001 | Mraz | ............... | E21C 25/58 198/303 |
| 6,298,920 B1 * | 10/2001 | Keller | ............... | E21B 19/00 166/377 |
| 6,328,501 B1 * | 12/2001 | Gimbert | ............... | E21D 11/08 285/293.1 |

(56) References Cited

U.S. PATENT DOCUMENTS

| | | | | |
|---|---|---|---|---|
| 6,484,757 B1 * | 11/2002 | Warren | | F16L 55/179 138/97 |
| 6,533,500 B1 * | 3/2003 | Jacobsen | | E02B 9/06 405/150.1 |
| 6,554,368 B2 * | 4/2003 | Drake | | E21B 7/002 299/1.3 |
| 6,644,753 B2 * | 11/2003 | Mraz | | E21C 25/58 299/1.4 |
| 6,679,293 B2 * | 1/2004 | Driver | | F16L 55/1651 138/97 |
| 6,698,843 B2 * | 3/2004 | Mraz | | E21C 25/58 198/303 |
| 6,869,147 B2 * | 3/2005 | Drake | | E21B 7/002 299/1.3 |
| 6,953,307 B2 * | 10/2005 | Graham | | B29C 53/385 166/242.2 |
| 7,387,174 B2 * | 6/2008 | Lurie | | E21B 7/20 175/171 |
| 7,448,413 B2 * | 11/2008 | Kiest, Jr. | | F16L 55/1651 138/97 |
| 7,517,212 B2 * | 4/2009 | Blackmore | | B29C 63/36 138/97 |
| 8,141,647 B2 * | 3/2012 | Kriesels | | E21B 43/105 166/207 |
| 8,387,709 B2 * | 3/2013 | Kriesels | | E21B 43/103 166/207 |
| 8,567,491 B2 * | 10/2013 | Lurie | | E21B 7/20 166/107 |
| 2002/0066598 A1 * | 6/2002 | Rozendaal | | E21B 7/046 175/53 |
| 2003/0151297 A1 * | 8/2003 | Graham | | B29C 53/385 299/8 |
| 2003/0159776 A1 * | 8/2003 | Graham | | B29O 53/385 156/293 |
| 2005/0034896 A1 * | 2/2005 | Youan | | E21B 7/20 175/53 |
| 2007/0084555 A1 * | 4/2007 | Graham | | B29O 53/385 156/293 |
| 2010/0314931 A1 * | 12/2010 | Ebner | | E21D 9/1006 299/33 |
| 2011/0129300 A1 * | 6/2011 | Dimillo | | E21D 11/155 405/152 |
| 2012/0234603 A1 * | 9/2012 | Vail, III | | E21B 4/02 175/57 |

FOREIGN PATENT DOCUMENTS

| | | |
|---|---|---|
| DE | 19808478 A1 | 9/1999 |
| DE | 102012004762 A1 | 9/2013 |
| EP | 0360321 A1 | 3/1990 |
| EP | 2447462 A1 | 5/2012 |
| WO | 2013040408 A3 | 5/2013 |

\* cited by examiner

METHOD AND DEVICE FOR TRENCHLESS PIPE LAYING

The invention relates to a boring and laying device for the trenchless laying of a pipeline, for example having a diameter of more than 350 mm or more than 500 mm, with a boring head for loosening the rock, wherein the boring head has a connection for a pilot bore linkage and a connection for a following element of the boring and laying device, with a rotary element and with a connecting portion as a connection for the pipeline, and to a boring and laying method for the trenchless laying of a pipeline, in which a pilot bore is produced from a starting point to a destination point along a predetermined boring line, wherein the pilot bore is obtained by advancing a pilot boring head with a pilot bore linkage of less than 800 mm, and in which, after reaching the destination point, a boring and laying head is connected to one end of the pilot bore linkage, which head is connected to the pipeline and via which the borehole is expanded, and simultaneously the pipeline is laid by pulling the pilot bore linkage out of the borehole on one side and/or by pushing the pipeline into the borehole.

Such a device and such a method are known from EP 2 447 462. EP 2 447 462 discloses a method for the trenchless laying of a pipeline. A HDD pilot boring operation is carried out from a starting point to a destination point. The pilot bore string is connected to a reamer at the destination point. The reamer expands the borehole to the final diameter. A rotary element is arranged between the reamer and the pipeline such that the reamer can rotate together with the pilot bore string, whereas the pipeline is drawn in without rotation. The pipeline is pushed into the borehole via a pushing device, while the pilot bore string elements are pulled out of the borehole on the remaining opposite side. The area of use for the disclosed method is specified for soil which is not too hard. A disadvantage here is that, as can be seen from the figures, considerable overcutting is required in order to ensure that the drillings loosened by the reamer can be transported away.

EP 0 360 321 likewise discloses a so-called horizontal directional drilling (HDD) method in which, for trenchless laying of a pipeline under an obstacle, a pilot bore is produced from a starting point to a destination point along a predetermined boring line. A reamer is then attached to the pilot bore string at the destination side and is connected to the pipeline to be laid. The reamer is driven by rotating the pilot string. Advancing the reamer while simultaneously pulling in the pipeline is achieved by pulling out the pilot bore string. Here, the reamer is configured such that it is closed at the connection side to the pipeline. Only a discharge line for discharging the loosened soil in connection with a suspension for lubricating the pipeline, for holding open the borehole and for transporting away the drillings is provided in the drill line. On the front side, the reamer is configured to be open such that the earth loosened by the reamer can enter the reamer and can be discharged while being mixed with water there. The reamer itself constitutes a cylindrical body which has teeth on its front side by means of which the soil is loosened. The use of this method is limited to loose rock, that is to say nonstable building ground such as soils, sands or the like.

DE 198 08 478 likewise discloses a method for the trenchless laying of pipes. Here, an HDD pilot bore is likewise driven from a starting point to a destination point. At the destination point, the HDD pilot string is connected to a microtunnel boring machine on which the pipeline is arranged with high tensile strength. The microtunnel boring machine loosens the soil and transports it away through the pipe string. Here, the use of this method in loose rock is also disclosed.

U.S. Pat. No. 5,269,384 discloses a method and a device for expanding and cleaning a borehole, here, a pilot bore is likewise produced by means of an HDD-boring process. A reamer is then attached to the pilot bore string. Provided behind the reamer is a pipeline which substantially corresponds to the diameter of the pilot bore string. To convey away the soil loosened by the reamer, a Venturi-effect pump is provided which is driven by means of drilling suspension. As a result of the negative pressure arising on the suction side of the pump, the drillings are sucked behind the reamer and transported away through the pipeline. The use of the method described here and of the device described here is deemed to be advantageous particularly when, on account of unstable borehole conditions or boring in loose rock, the drillings cannot be better discharged by increasing the flow rate of the borehole mud, since under the stated conditions this leads to flush-outs in the borehole wall. The area of use specified here is boring and laying in loose rock. The design of the boring device has proved to be very complicated and unpractical, in particular in relatively solid rocks.

A disadvantage of these devices and methods is that they can only be used in loose rock. Furthermore, it is not readily possible for the drillings to be conveyed away in a controlled manner. It has been attempted, inter alia, to compensate for this by carrying out considerable overcuttings in some cases.

The object of the invention is to provide a boring and laying device and a method by means of which the aforementioned disadvantages are overcome.

With regard to the boring and laying device, the solution according to the invention provides that a conveying portion is provided behind the boring head, in which conveying portion at least one receiving element for receiving the loosened rock is provided, that a functional portion is provided in which a pump for suctioning and conveying away the drillings loosened by the boring head is arranged and on which the connecting portion is arranged, and that the rotary element is arranged between the boring head and functional portion such that the functional portion and the boring head are rotationally decoupled.

It is advantageous here that it is possible to convey away the drillings in a targeted manner. Furthermore, it has been surprisingly shown that it is possible by this design to lay pipelines particularly in stable rock without having to provide considerable overcutting.

An advantageous teaching of the invention provides that the boring head is a raise-boring head or an expansion boring head, preferably with cutting rollers. As a result, laying the pipeline in solid rock is possible in a particularly straightforward manner.

An advantageous teaching of the invention provides that the conveying portion is a shield portion connected to the functional portion. Furthermore, it is advantageous that the shield portion is configured such that it is movable, preferably can be moved, with respect to the functional portion, particularly preferably via hydraulic cylinders. By hydraulically activating the hydraulic cylinders, they can advantageously be used as a rescue tool. By alternating pressure loading of the cylinders it is possible for a jammed pipe string to be shaken free again. The conveying-away of the drillings is improved by the shield portion. The movability of the boring and laying device in the borehole is improved in a simple manner by the hydraulic cylinders. Furthermore, it is advantageous that at least one cutting tool is provided on the shield portion. As a result, any loose rock which may still be present in the bore wall is simply loosened. This leads to wear reduction.

An advantageous teaching of the invention provides that the hydraulic cylinder is provided as a measuring element. As a result, it is possible in a simple manner to detect the pulling force or the prevailing friction. Furthermore, the angling in the device can be detected via the detection of the piston. It is also possible for a remeasurement of the borehole to be carried out via the detection of the angling.

An advantageous teaching of the invention provides that a lubricating device is provided which is preferably arranged behind or on the receiving portion and/or the functional portion, wherein outlets for discharging lubricant, preferably drilling suspension, are provided for this purpose.

An advantageous teaching of the invention provides that the receiving element is a suction element, preferably a suction nozzle and/or a suction funnel. As a result, suctioning of the drillings is made possible or facilitated. Furthermore, it is advantageous that a separating element for separating the drillings according to their particle size is provided on the suction element. This separating element functions as a particle limiter. By virtue of it, clogging of the conveying line or pumps by solid particles or fragments which are too large is prevented.

An advantageous teaching of the invention provides that the conveying portion is a rotation body with inlet portions, wherein the inlet portions are preferably embodied in the manner of vanes with integrated inlet openings. Furthermore, it is advantageous that the pump is a jet pump. An alternative teaching of the invention provides that the pump is a centrifugal pump. By means of these two variants, the drillings can be conveyed away with low wear and efficiently at low costs. Furthermore, it is advantageous that the rotary element is configured such that drilling mud can be pumped through the rotary element.

An advantageous teaching of the invention provides that the boring and laying operation can be carried out in solid rock with an average strength of greater than 150 MPa, preferably of greater than 200 MPa.

With respect to the boring and laying method, the solution according to the invention provides that the drillings loosened by the boring head are hydraulically received behind the boring head of the boring and laying device and conveyed away out of the borehole by means of a pump arranged in the borehole, and that the laying operation is carried out in a stable rock with an average strength of greater than 150 MPa, preferably of greater than 200 MPa, wherein in particular a pipeline with a diameter of greater than 350, 500 or 800 mm is laid.

An advantageous teaching of the invention provides that a raise-boring head, preferably with cutting rollers, is used as the boring head.

An advantageous teaching of the invention provides that the pipeline is a pipeline made up of pipe sections connected to one another with a high tensile strength, wherein the pipe sections used are drill pipes or product pipes which are either laid individually to form pipe runs made up of a plurality of pipe sections or are laid as a completely prepared pipeline.

An advantageous teaching of the invention provides that the boring and laying head is a boring and laying device of the above-described type.

Figure 2:
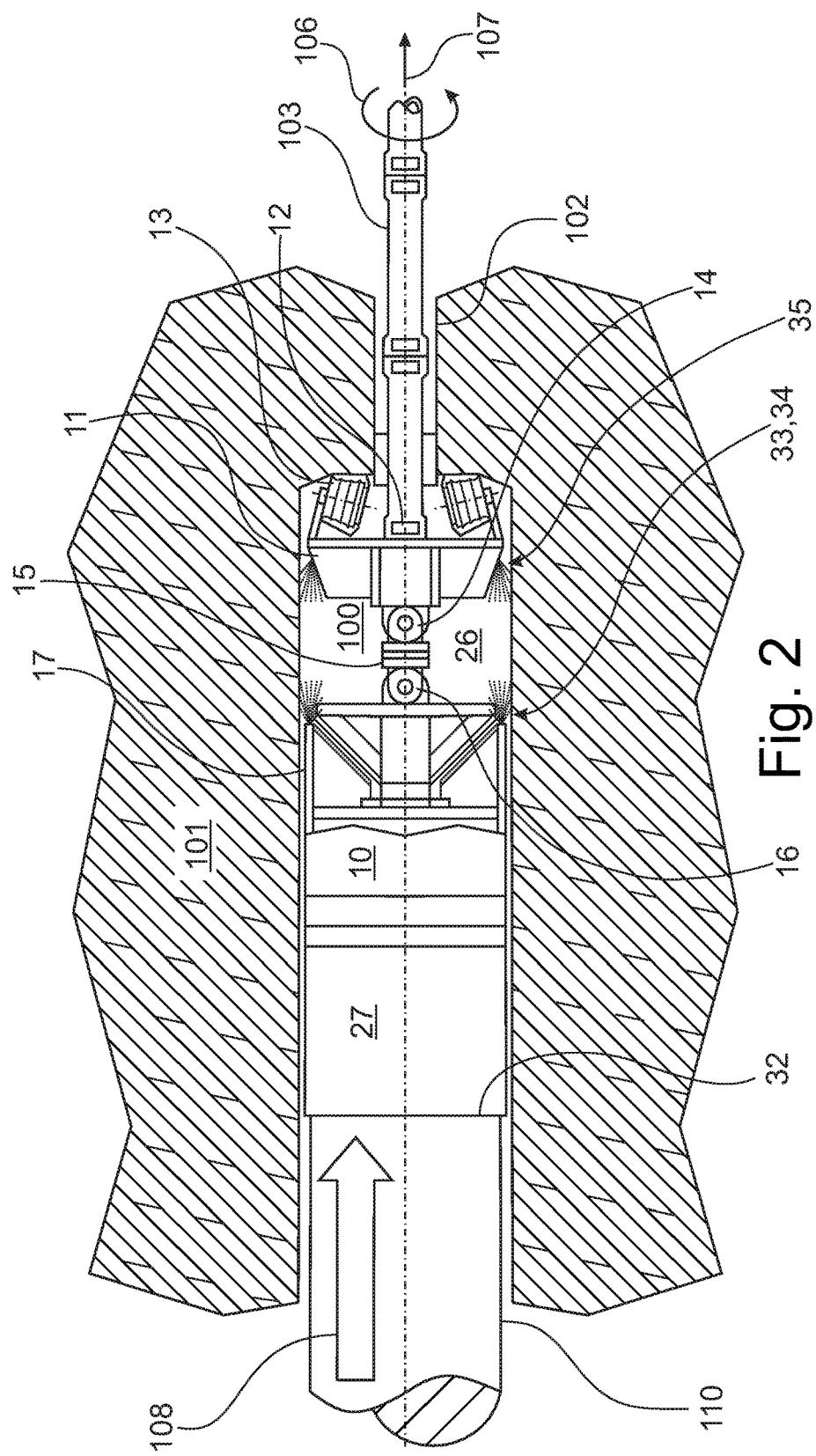

The invention will be described in more detail below in conjunction with a drawing, in which:

FIG. 1 shows a sectional view of a first embodiment of the device according to the invention, and FIG. 2 shows a sectional view of a second embodiment of the device according to the invention.

FIG. 1 shows a boring and laying device 10 according to the invention in a borehole 100. The borehole 100 is arranged in a solid rock 101. The borehole 100 is preceded by a pilot borehole 102 which has been produced by means of an HDD method from a starting point (not shown) to a destination point (not shown) by means of a correspondingly suitable boring device. The pilot bore string 103 is illustrated in FIG. 1 in addition to the pilot borehole 102. The boring and laying device 10 is composed of a boring head 11 which has a connection 12 for a pilot bore string 103. Cutting rollers 13 are arranged on the boring head 11 in the expansion region 104. Said rollers are in engagement with the working face 105 during the boring and laying operation. Provided on the rear side of the boring head 11 is a connection 14 at which a rotary element 15 is connected to the boring head 11. The rotary element 15 serves for decoupling the boring head with respect to the pipeline 110, which is arranged on the rear side of the boring and laying device 10.

At its opposite side, the rotary element 15 is connected via a connection 16 to a receiving element 17. The receiving element 17 consists of a basic body 18 and a shield portion 19 which is arranged movably with respect to the basic body 18. To form a connection between the basic body 18 and shield portion 19, hydraulic cylinders 20 are provided which are connected via connection elements 21, 22 to the basic body 18 on one side and shield portion 19 on the other side. The shield portion 19 has on its inner side a conically tapering receiving portion 23. Within the receiving portion 23 there is arranged a receiving element 24 which is configured as a suction nozzle in the embodiment according to FIG. 1. The front part 25 of the suction nozzle 24 protrudes through the receiving portion 23 of the shield portion 19 into the receiving space 26. Behind the receiving element 17 and fixedly connected thereto is a functional portion 27 having a pump 28 in its interior. The suction nozzle 24 is connected to the pump 28 via a line 29. A distributing element 30 is arranged in the line 29 between the pump 28 and suction nozzle 24. This distributing element connects, inter alia, the suction nozzle to the pump 28.

Furthermore, a further suction nozzle 37 is provided which is a constituent part of a suctioning means 36. The fine fractions of the drillings which are also deposited on the borehole bottom 109 are sucked up via the suctioning means 36. As a result, piling up of the fine fractions of the drillings on the borehole bottom 109 is avoided, which, as has been found out, can lead to jamming of the pipe string when they are deposited on the borehole bottom 109. This fine particle suctioning means is connected to the distributor 30 or else directly to the line 29 of the suction nozzle 24.

Furthermore, a lubricant device 40 is provided. For this purpose, the distributor 30 is, for example, connected to a line (not shown) which introduces lubricant into the borehole. Then, for example, as illustrated in FIG. 1, a line 38 going out from the distributor 30 is provided which is connected to outlets 39 for discharging the lubricant. These outlets 39 are provided circumferentially.

A conveying line 31 is arranged on the rear side of the pump 28, accordingly the conveying-away side of the pump. The drillings (not shown) loosened by the boring head 11, together with the drilling mud (not shown), are conveyed away via the conveying line 31. The drillings are then separated from the drilling mud above ground and the drilling mud is fed back to the borehole. A connection 32 for connecting the pipeline 110 to the boring and laying device 10 is provided on the rear side of the functional portion 27.

The boring head 11 is rotated by rotating the pilot bore string 103, for example in the direction of rotation 106. At the same time, a pulling force is exerted on the boring and laying device 10 in the pulling direction 107 via the pilot bore string 102, with the result that the boring head 11 is pressed with its cutting rollers 13 against the working face 105 and, owing to the rotation in the direction of rotation 106, runs over the working face 105 and in the process loosens the in situ solid rock 101. The loosened drillings are flushed behind the boring head 11 by means of drilling mud delivered to the cutting rollers. In addition, the drilling mud is sucked up via the pump 28 and the suction nozzle 24 and thus causes the drillings to be transported from the working face to the suction nozzle.

In addition, or alternatively, it is possible for there to be exerted over the pipeline 110 a thrust force in the thrust direction 108, for example using a so-called pipe thruster as an advancing device (not shown), by means of which, on the one hand, the pipeline 110 is introduced into the borehole 100 and, on the other hand, there is also the possibility of pressing the cutting rollers 12 of the boring head 11 into the working face 105. Through the provision of the rotary element 15 (swivel), the boring head 11 and the pipeline 110 or the constituent parts of the boring and laying device 10 arranged therebehind are rotationally decoupled.

The boring head 11 illustrated in FIG. 1 is a so-called raise-boring head. By means of it, the solid rock 101 is expanded in one phase such that the pipeline 101 is directly introduced into the borehole. Flushing outlets 33 and/or cutting chisels 34 are arranged on the side of the receiving portion 23 that faces the boring head 11. Flushing outlets 35 are also provided on the rear side of the boring head 11. The drillings situated on the bore bottom 109 or the drillings situated in the receiving space 26 are moved through the flushing outlets 33, 35 such that they can be sucked up into the suction nozzle 24 by means of the pump 28.

The cutting chisels 34 serve on the one hand, for better reception of coarser drillings and, on the other hand, for loosening rock which is still situated on the bore bottom 109 or projects from the borehole wall 111 and has not yet been completely loosened, or loose rock.

FIG. 2 shows an alternative embodiment of the boring and laying device 10. Here, too, there is provided a borehole 100 in a solid rock 101 with a pilot borehole 102 at which a pilot bore string 103 is located. The pilot bore string 103 is fastened via a connection 12 to a boring head 11 having cutting rollers 13. A connection 14 for a rotary element 15 is situated on the rear side of the boring head 11. This rotary element is connected via a connection 16 to a receiving element 17. Flushing outlets 33 and cutting tool 34 are arranged on the receiving element 17. Flushing outlets 35 are provided on the rear side of the boring head 11. A functional portion 27 in a nonsectioned view is illustrated behind the receiving element 17. The pump 28 is provided in the interior of the functional portion 27. On the rear side of the functional portion 27 there is provided a connection 32 to which the pipeline 110 is fastened. The receiving element 17 is provided without a shield portion 19. Such a use can be provided when solid rock 101 is present in which cave-ins are not expected, with the result that the receiving space 26 can remain without a shield lining. The introduction of the pipeline 110 by the boring and laying device 10 according to FIG. 2 is achieved analogously to the device 10 according to FIG. 1.

LIST OF REFERENCE SIGNS

10 Boring and laying device
11 Boring head
12 Connection
13 Cutting roller
14 Connection
15 Rotary element
16 Connection
17 Receiving element
18 Basic body
19 Shield portion
20 Hydraulic cylinder
21 Connection element
22 Connection element
23 Receiving portion
24 Receiving element/suction nozzle
25 Front part
26 Receiving space
27 Functional portion
28 Pump
29 Line
30 Distributing element
31 Conveying line
32 Connection
33 Flushing outlet
34 Cutting tool
35 Flushing outlet
36 Suctioning means
37 Suction nozzle
38 Line
39 Lubricant outlet
40 Lubricating device
100 Borehole
101 Solid rock
102 Pilot borehole
103 Pilot bore string
104 Expansion region
105 Working face
106 Direction of rotation
107 Pulling direction
108 Thrust direction
109 Bore bottom
110 Pipeline
111 Borehole wall

The invention claimed is:

1. A boring and laying method for the trenchless laying of a pipeline, in which a pilot bore is produced from a starting point to a destination point along a predetermined boring line and a boring head of a boring and laying device is connected to the pilot bore linkage after reaching the destination point, comprising:
    expanding the pilot bore via the boring head to a borehole and simultaneously laying the pipeline into the borehole by at least one of pulling the pilot bore linkage out of the pilot bore on one side or by pushing the pipeline into the borehole,
    wherein the boring head of the boring and laying device is rotated via the pilot bore linkage,
    wherein rock loosened by the boring head is hydraulically received behind the boring head of the boring and laying device and conveyed away, together with drilling mud, out of the borehole by of a pump in the borehole and a conveying line connected to the pump and arranged inside the pipeline, wherein the boring head is rotationally and pivotally decoupled from a functional element of the boring and laying device containing a receiving portion, a pumping portion, and a pipeline connecting portion via a rotary element with a connection on one side to the functional element and a connection on the other side with the boring head, and wherein the boring head is pivotally decoupled from the functional element of the boring and laying device via the connection of the rotary element with at least one of the functional element or the boring head, and the operation of the boring and laying method is carried out in a stable rock with an average strength of greater than 150 MPa or of greater than 200 MPa.

2. The boring and laying method as claimed in claim 1, wherein a raise-boring head is used as the boring head to expand the pilot bore.

3. The boring and laying method as claimed in claim 1, wherein the pipeline comprises pipe sections connected to one another with a high tensile strength, wherein the pipe sections used are at least one of drill pipes or product pipes which are at least one of laid individually to form pipe runs made up of a plurality of pipe sections or are laid as a completely prepared pipeline.

4. A boring and laying device for the trenchless laying of a pipeline, comprising:
 a boring head configured to loosen rock and to bore a hole into a drilling face in which to lay the pipeline, comprising a connection for a pilot bore linkage disposed in a boring direction of the boring head which is used to rotate the boring head;
 a functional element comprising:
 a receiving portion with a receiving element configured to collect loosened rock by the boring head;
 a functional portion connected to the receiving portion containing a pump;
 a connection portion connected to the functional portion configured to connect the pipeline to the boring and laying device;
 a rotary element arranged between and connected with the boring head and the functional element, the rotary element being configured to rotationally decouple the boring head from the receiving element;
 wherein the pump is configured to collect the loosened rock from the receiving portion and convey the loosened rock via a conveying line inside the pipeline connected to the pump;
 wherein the boring head is pivotable with respect to the functional element via the connection of the rotary element with at least one of the functional element or the boring head; and
 wherein the connection portion is rigidly connected to the pipeline to directly transfer pushing forces applied to the pipeline to the boring and laying device and pulling forces applied to the boring and laying device to the pipeline.

5. The boring and laying device as claimed in claim 4, wherein the boring head is a raise-boring head.

6. The boring and laying device as claimed in claim 4 comprising a shield portion connected to the functional element as part of the receiving portion.

7. The boring and laying device as claimed in claim 4 wherein the receiving element contains a suction element.

8. The boring and laying device as claimed in claim 4 wherein a boring and laying operation can be carried out in solid rock with an average strength of greater than 150 MPa or greater than 200 MPa.

9. The boring and laying device as claimed in claim 4 wherein the pump is at least one of a jet pump or a centrifugal pump.

10. The boring and laying device as claimed in claim 4 wherein the rotary element is configured to pump drilling mud through the rotary element.

11. The boring and laying device as claimed in claim 4 comprising a lubricating device at least one of behind or on at least one of the receiving portion or the functional portion including outlets for discharging lubricant.

12. The boring and laying device as claimed in claim 5, wherein the raise-boring head is equipped with cutting rollers.

13. The boring and laying device as claimed in claim 7, wherein the suction element comprises a separating element for separating the loosened rock according to their particle size.

14. The boring and laying device as claimed in claim 7, wherein the suction element is one of a suction nozzle or a suction funnel.

15. The boring and laying device as claimed in claim 6, wherein the shield portion is configured to be movable with respect to the functional portion.

16. The boring and laying device as claimed in claim 15, wherein the shield portion is configured to be moved with respect to the functional portion via hydraulic cylinders.

17. The boring and laying device as claimed in claim 16, wherein at least one of the hydraulic cylinders is used as a measuring element.

* * * * *